(12) United States Patent
Venkatachari et al.

(10) Patent No.: US 12,081,462 B2
(45) Date of Patent: Sep. 3, 2024

(54) TIME DIVISION DUPLEX CONFIGURATION OVERRIDE

(71) Applicant: QUALCOMM Incorporated, San Diego, CA (US)

(72) Inventors: Harish Venkatachari, San Jose, CA (US); Amir Aminzadeh Gohari, Sunnyvale, CA (US); Udayan Bhawnani, San Diego, CA (US); Sandeep Rao, San Diego, CA (US); Scott Hoover, Del Mar, CA (US); Sundaresan Tambaram Kailasam, San Diego, CA (US); Sharad Shahi, Boulder, CO (US)

(73) Assignee: QUALCOMM Incorporated, San Diego, CA (US)

(*) Notice: Subject to any disclaimer, the term of this patent is extended or adjusted under 35 U.S.C. 154(b) by 106 days.

(21) Appl. No.: 17/103,759

(22) Filed: Nov. 24, 2020

(65) Prior Publication Data

US 2021/0167903 A1  Jun. 3, 2021

Related U.S. Application Data

(60) Provisional application No. 62/942,020, filed on Nov. 29, 2019.

(51) Int. Cl.
*H04L 5/00* (2006.01)
*H04L 5/14* (2006.01)
*H04W 72/23* (2023.01)
*H04W 74/0808* (2024.01)
*H04W 88/06* (2009.01)

(52) U.S. Cl.
CPC ............. *H04L 5/001* (2013.01); *H04L 5/14* (2013.01); *H04W 72/23* (2023.01); *H04W 74/0825* (2013.01); *H04W 88/06* (2013.01)

(58) Field of Classification Search
CPC .......... H04L 5/001; H04L 5/14; H04W 72/14; H04W 74/0825; H04W 88/06; H04W 72/0446
USPC ...................................................... 370/280
See application file for complete search history.

(56) References Cited

U.S. PATENT DOCUMENTS

| | | | |
|---|---|---|---|
| 2012/0120821 A1* | 5/2012 | Kazmi | H04W 56/0045 370/336 |
| 2016/0366626 A1* | 12/2016 | Krishnamoorthy | H04W 36/20 |
| 2017/0257807 A1* | 9/2017 | Zacharias | H04W 76/28 |
| 2017/0331611 A1* | 11/2017 | Stern-Berkowitz | H04W 72/23 |
| 2019/0013881 A1* | 1/2019 | Olesen | H04B 15/00 |
| 2019/0159274 A1* | 5/2019 | Hong | H04W 28/082 |
| 2019/0363843 A1* | 11/2019 | Gordaychik | H04L 1/08 |
| 2020/0351865 A1* | 11/2020 | Choi | H04L 1/1896 |
| 2021/0068086 A1* | 3/2021 | Behravan | H04W 72/1289 |
| 2021/0168808 A1* | 6/2021 | Harada | H04W 72/0453 |
| 2021/0376989 A1* | 12/2021 | Lim | H04L 5/0092 |

* cited by examiner

*Primary Examiner* — Nizam U Ahmed
(74) *Attorney, Agent, or Firm* — Patterson & Sheridan LLP

(57) ABSTRACT

Certain aspects of the present disclosure provide techniques for time division duplex configuration override. A method that may be performed by a user equipment (UE) includes detecting a period during which a configuration of a first radio access technology (RAT) conflicts with a configuration of a second RAT for a frequency band; and overriding the configuration of the second RAT with the configuration of the first RAT for the period.

26 Claims, 9 Drawing Sheets

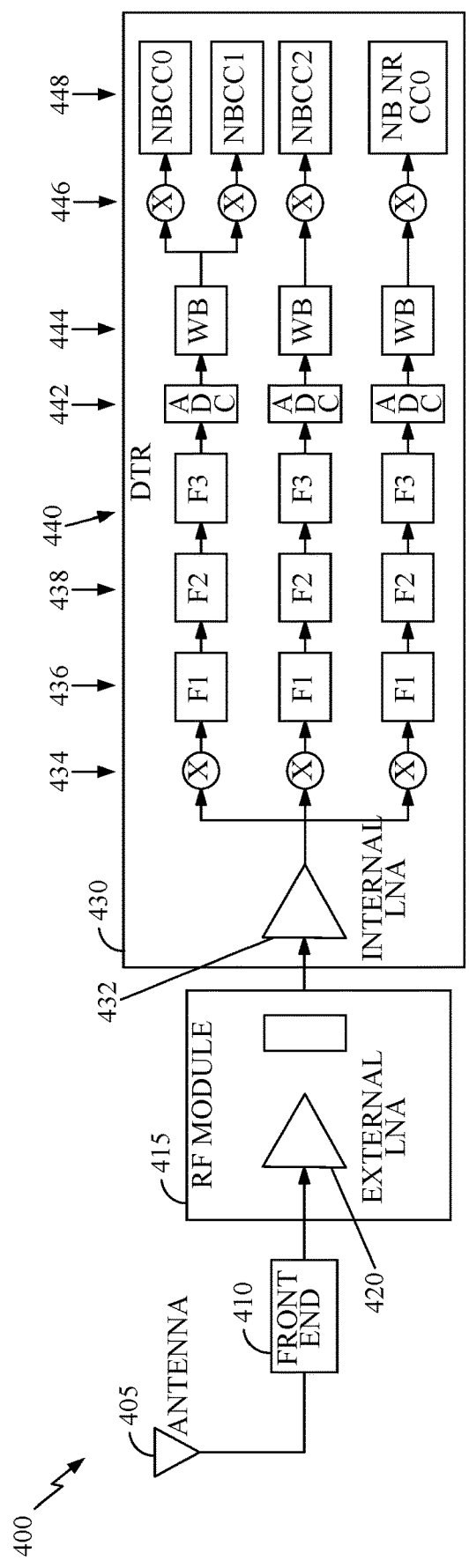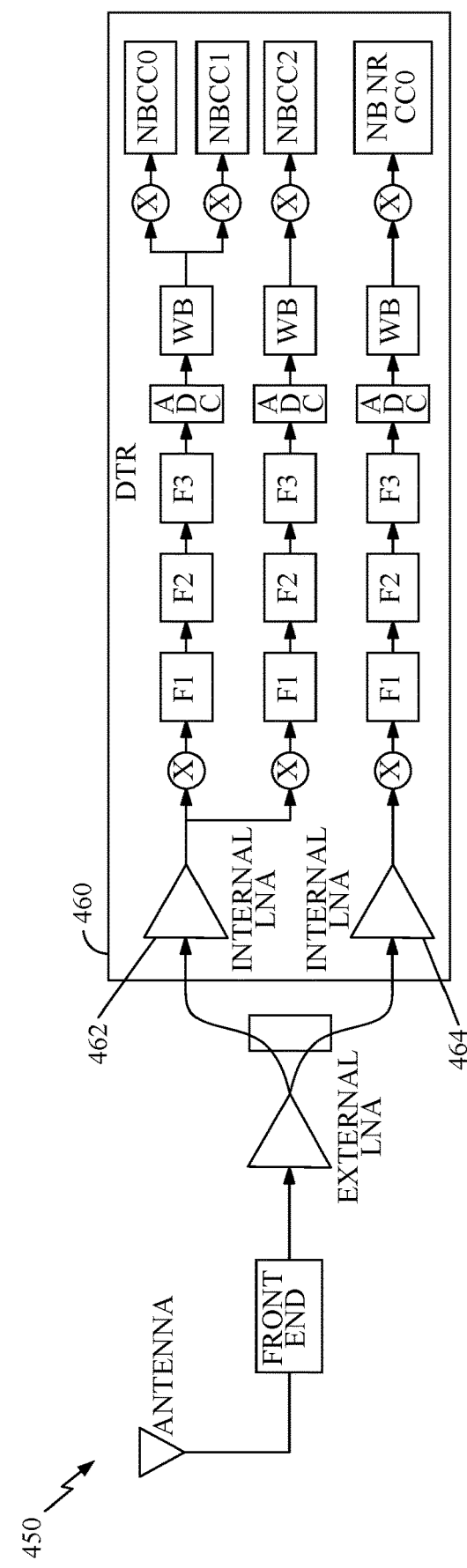
FIG. 4A
FIG. 4B

TIME DIVISION DUPLEX CONFIGURATION OVERRIDE

CROSS-REFERENCE TO RELATED APPLICATION(S)

This application claims benefit of and priority to U.S. Provisional Application No. 62/942,020, filed Nov. 29, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for overriding time division duplex (TDD) configurations.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved prevention of damage to components of user equipment while enabling the UEs to share components between long term evolution (LTE) networks and new radio (NR) networks.

Certain aspects the subject matter described in this disclosure can be implemented in a method for wireless communication. The method generally includes detecting a period during which a configuration of a first radio access technology (RAT) conflicts with a configuration of a second RAT for a frequency band. The method generally includes overriding the configuration of the second RAT with the configuration of the first RAT for the period.

Certain aspects the subject matter described in this disclosure can be implemented in a method for wireless communication. The method generally includes detecting a period during which a configuration of a first RAT conflicts with a configuration of a second RAT for a frequency band. The method generally includes rejecting the configuration of a component carrier of the second RAT based on a number of conflicts meeting or exceeding a threshold of conflicts between the configuration of the first RAT and the configuration of the second RAT for the period.

Certain aspects the subject matter described in this disclosure can be implemented in an apparatus for wireless communication. The apparatus generally includes at least one processor and memory coupled to the at least one processor. The memory generally includes code executable by the at least one processor to cause the apparatus to detect a period during which a configuration of a first RAT conflicts with a configuration of a second RAT for a frequency band. The memory generally includes code executable by the at least one processor to cause the apparatus to override the configuration of the second RAT with the configuration of the first RAT for the period.

Certain aspects the subject matter described in this disclosure can be implemented in an apparatus for wireless communication. The apparatus generally includes at least one processor and memory coupled to the at least one processor. The memory generally includes code executable by the at least one processor to cause the apparatus to detect a period during which a configuration of a first RAT conflicts with a configuration of a second RAT for a frequency band. The memory generally includes code executable by the at least one processor to cause the apparatus to reject the configuration of a component carrier of the second RAT based on a number of conflicts meeting or exceeding a threshold of conflicts between the configuration of the first RAT and the configuration of the second RAT for the period.

Certain aspects the subject matter described in this disclosure can be implemented in an apparatus for wireless communication. The apparatus generally includes means for detecting a period during which a configuration of a first RAT conflicts with a configuration of a second RAT for a frequency band. The apparatus generally includes means for overriding the configuration of the second RAT with the configuration of the first RAT for the period.

Certain aspects the subject matter described in this disclosure can be implemented in an apparatus for wireless communication. The apparatus generally includes means for detecting a period during which a configuration of a first RAT conflicts with a configuration of a second RAT for a frequency band. The apparatus generally includes means for rejecting the configuration of a component carrier of the second RAT based on a number of conflicts meeting or exceeding a threshold of conflicts between the configuration of the first RAT and the configuration of the second RAT for the period.

Certain aspects the subject matter described in this disclosure can be implemented in a computer readable medium storing computer executable code thereon for wireless communication. The computer-readable medium generally includes code for detecting a period during which a configuration of a first RAT conflicts with a configuration of a second RAT for a frequency band. The computer-readable medium generally includes code for overriding the configuration of the second RAT with the configuration of the first RAT for the period.

Certain aspects the subject matter described in this disclosure can be implemented in a computer readable medium storing computer executable code thereon for wireless communication. The computer-readable medium generally includes code for detecting a period during which a configuration of a first RAT conflicts with a configuration of a second RAT for a frequency band. The computer-readable medium generally includes code for rejecting the configuration of a component carrier of the second RAT based on a number of conflicts meeting or exceeding a threshold of conflicts between the configuration of the first RAT and the configuration of the second RAT for the period.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 4A-4B show example receive chains of a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
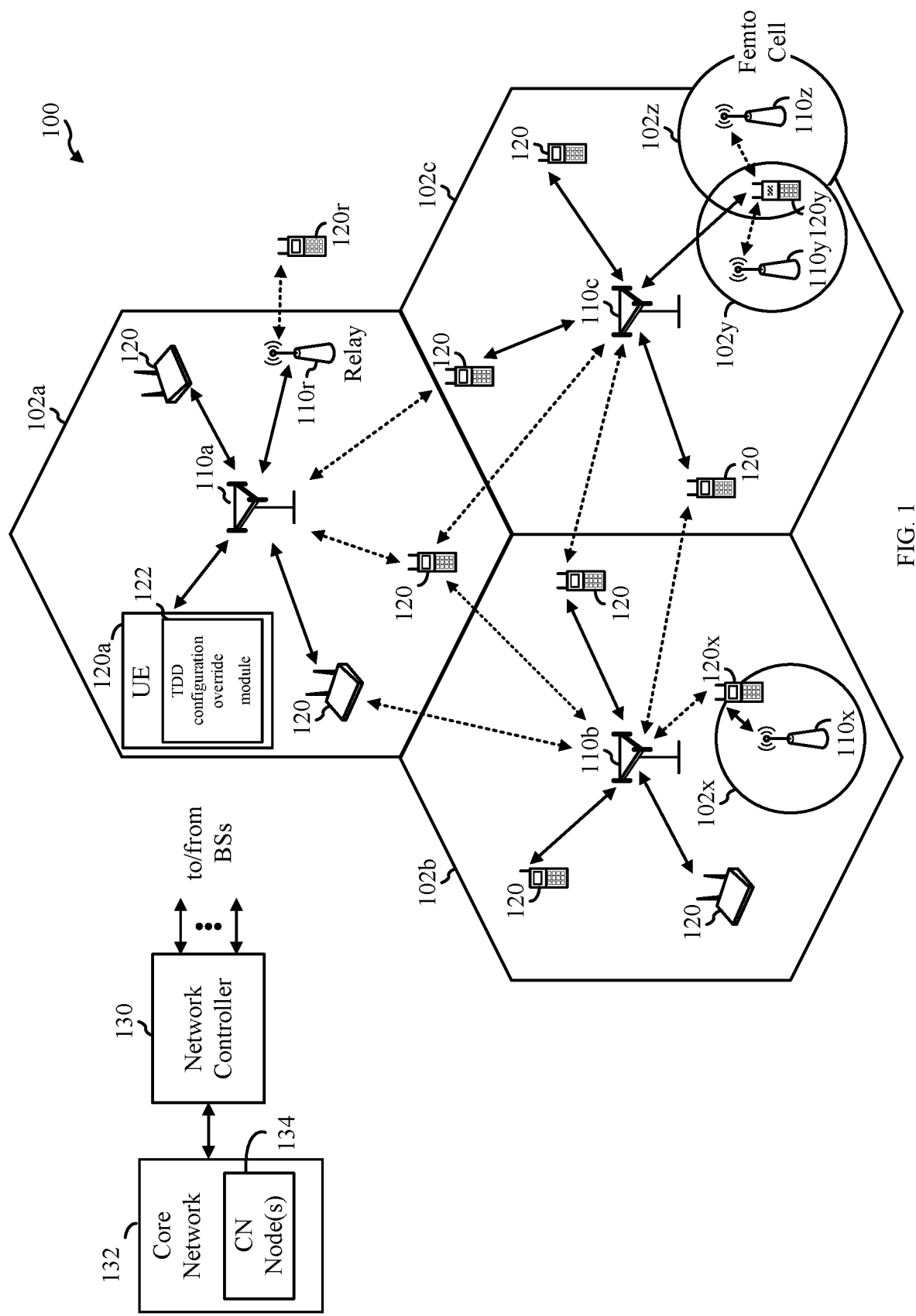
FIG. 1 is a block diagram conceptually illustrating an example telecommunications system, in accordance with certain aspects of the present disclosure.

Aspects of the present disclosure provide apparatus, methods, processing systems, and computer readable mediums for protecting a low noise amplifier of a user equipment (UE) that is shared between two or more radio access technologies (RATs) by overriding a time division duplex (TDD) configuration of a RAT. When a UE shares a low noise amplifier (LNA) for combinations of RATs (e.g., long term evolution (LTE) and 5G new radio (NR)), there is a possibility of LNA damage when at least one of the RATs is operating using TDD. This damage results when the TDD configuration of a first RAT (e.g., LTE) conflicts with the configuration of a second RAT (e.g., NR) for a period of time. In aspects of the present disclosure, software-based techniques prevent damage to the LNA by overriding the configuration of the second RAT with the configuration of the first RAT for the period to make the configurations of the RATs compatible with each other.

The following description provides examples of overriding TDD configurations in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may include UEs 120 configured for overriding TDD configurations, in accordance with aspects of the present disclosure. As shown in FIG. 1, the UE 120a includes a TDD configuration override module. The TDD configuration override module may be configured to detect a period during which a configuration of a first radio access technology (RAT) conflicts with a configuration of a second RAT for a frequency band, and to override the configuration of the second RAT with the configuration of the first RAT for the period, in accordance with aspects of the present disclosure.

The wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively.

A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul. In aspects, the network controller 130 may be in communication with the core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
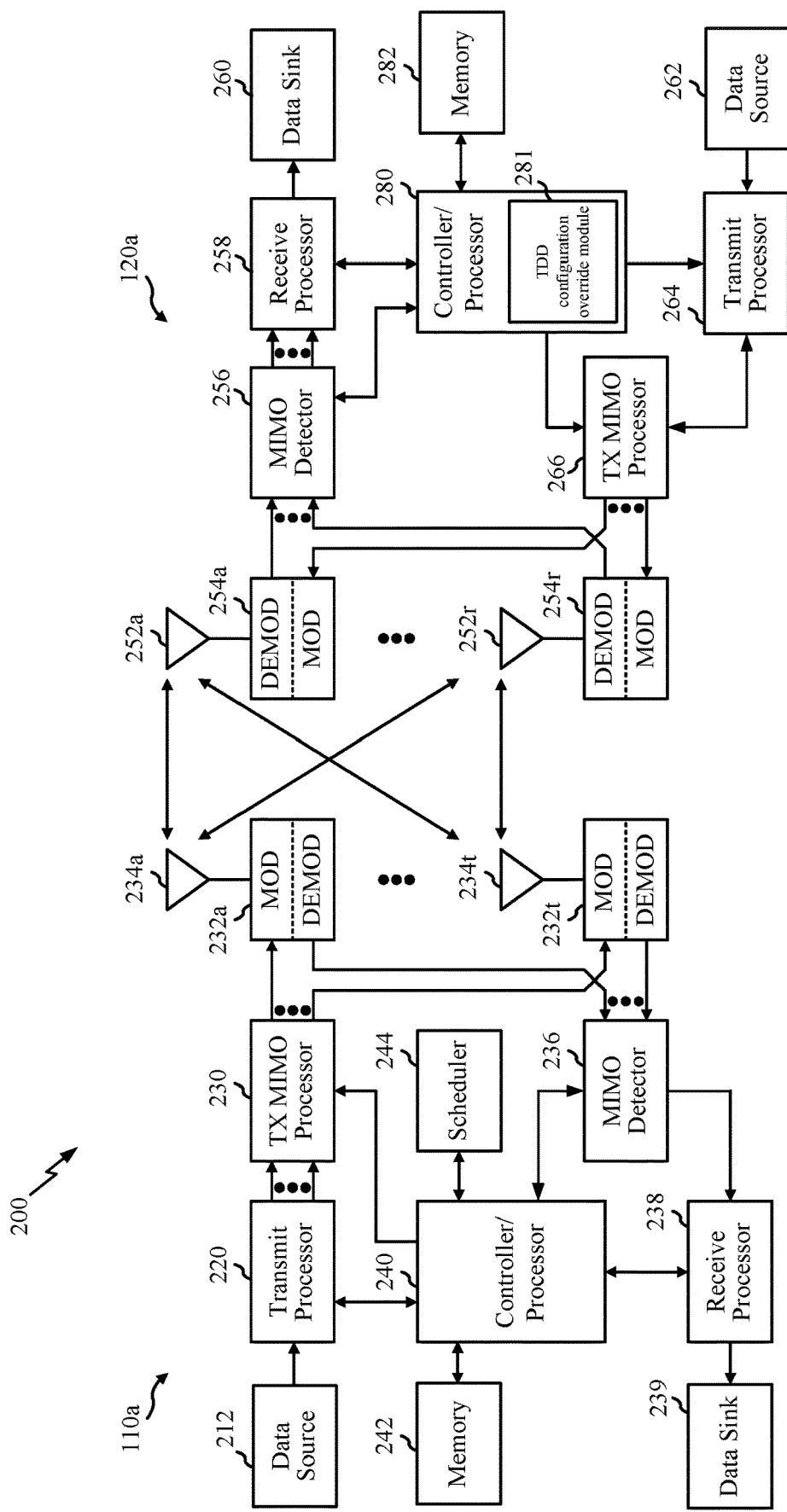
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 280 of the UE 120a has a TDD configuration override module 281 that may be configured for detecting a period during which a configuration of a first radio access technology (RAT) conflicts with a configuration of a second RAT for a frequency band, and overriding the configuration of the second RAT with the configuration of the first RAT for the period, according to aspects described herein. Although shown at the Controller/Processor, other components of the UE 120a and BS 110a may be used performing the operations described herein.

Figure 3:
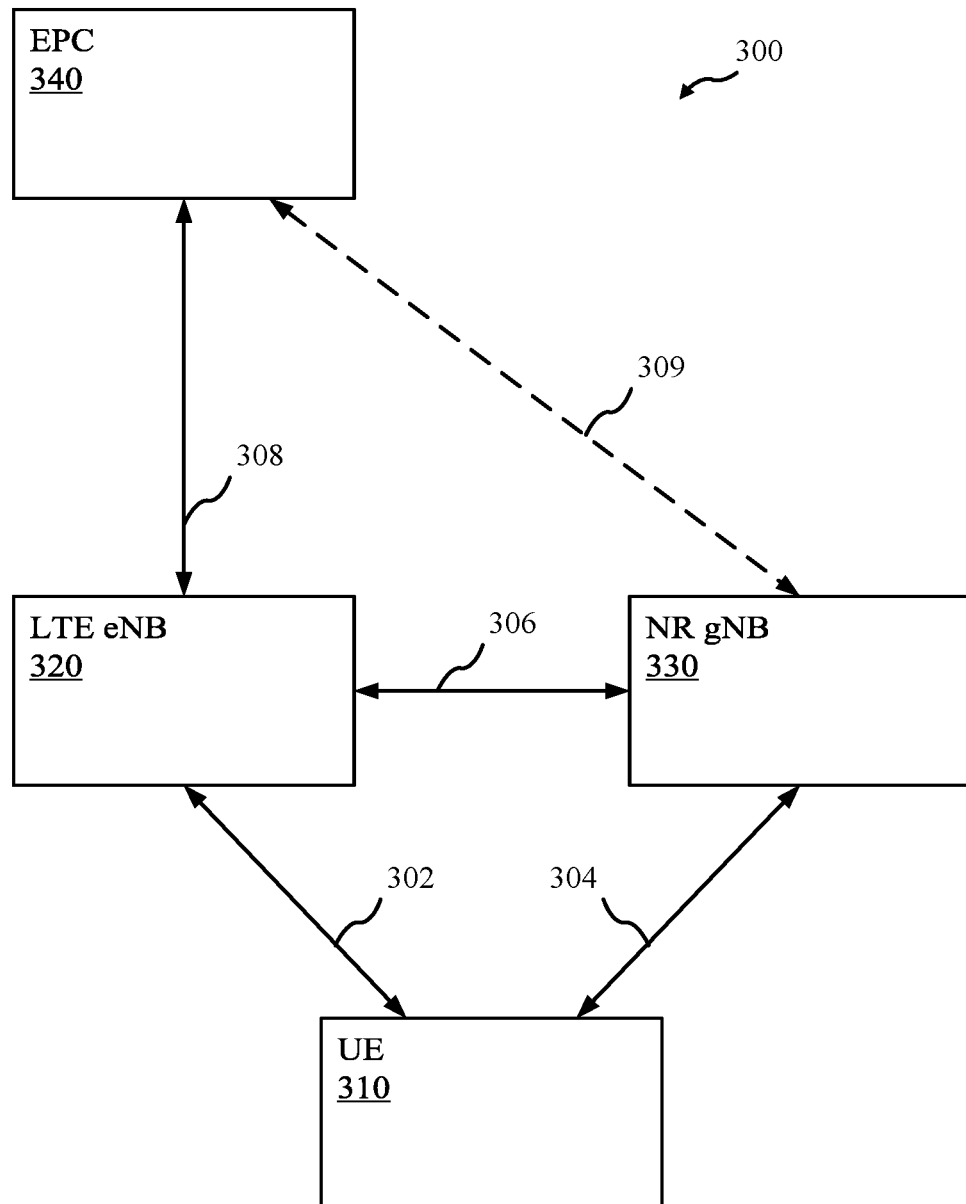
FIG. 3 is an example system architecture for dual connectivity between two radio access technologies (RATs), in accordance with certain aspects of the present disclosure.

FIG. 3 is a block diagram illustrating an example system architecture 300 for dual connectivity (DC) between E-UTRAN and 5G NR (EN-DC), in accordance with certain aspects of the present disclosure. As previously stated, with deployment of 5G, a UE 310 (e.g., UE 120a of FIG. 1) may have dual connectivity functionality allowing the UE 310 to simultaneously communicate with a first BS 320 (e.g., BS 110a of FIG. 1) utilizing an LTE RAT (e.g., a communication with an evolved NodeB (eNB)) and a second BS 330 (e.g., BS 110b of FIG. 1) utilizing a 5G NR RAT (e.g., a communication with a next generation BS (gNB)). While the example system architecture shows the first BS 320 and second BS 330 as separate base stations, the present disclosure is not so limited, and the first BS 320 and second BS 330 may be separate physical entities (e.g., transceivers) or separate logical entities (e.g., different software modules executing on one processing system with one transceiver) within a single base station (e.g., BS 110a of FIG. 1).

The UE 310 is configured to engage in a dual connectivity communication with the first BS 320 via interface 302 (e.g., a wireless interface, such as a Uu interface) and the second BS 330 via interface 304 (e.g., a wireless interface, such as a Uu interface). Here, the first BS 320 and the second BS 330 may be connected to one another via interface 306 (e.g., an X2 interface), as shown, and the first BS 320 may connect to an evolved packet core (EPC) 340 via interface 308 (e.g., an S1 interface), wherein interface 308 connects to a mobile management entity (MME) (control plane) and to a system architecture evolution (SAE) gateway (S-GW) (user plane). In some aspects of the present disclosure, the second BS 330 may optionally connect to the EPC 340 on the user plane via interface 309 (e.g., an S1-U interface).

FIGS. 4A and 4B show exemplary receive chains 400 and 450, which may be incorporated in UE 120a, in accordance with aspects of the present disclosure. The exemplary receive chain 400 receives a signal via one or more antennas 405, which supply the signal to a transceiver front end 410. The front end supplies the signal to a radio frequency (RF) module 415, which includes an external LNA 420. The RF module processes the signal, amplifies the signal with the LNA, and supplies the signal to the dual transceiver (DTR) module 430. The signal is amplified by an internal LNA 432 and supplied to one or more mixers 434, which mix the signal with local oscillator (LO) signals to downconvert the signals to intermediate frequency (IF) signals. The IF signals are filtered by filters 436 438, and 440, then supplied to analog-to-digital converters (ADCs) 442. The ADCs convert the filtered IF signals to digital I or Q signals. The digital signals are supplied to wideband (WB) filters 444 that filter the digital signals and supply the WB filtered digital signals to mixers 446. The mixers 446 mix the signal with LO signals to downconvert the signals to baseband frequency signals. The baseband frequency signals are supplied to LTE narrowband (NB) and NR NB filters 448 to extract the narrowband signals for each component carrier (CC) for LTE receiver and the NR receiver. The exemplary receive chain 450 shown in FIG. 4B is similar to the exemplary receive chain 400, and similar components of the exemplary receive chain 450 will not be further described. The exemplary receive chain 450 differs from the exemplary receive chain 400 in that the DTR 460 has two internal LNAs 462 and 464. Thus, the RF module supplies the signal both LNAs 462 and 464, which amplify the signals at the beginning of the processing that occurs in the DTR module.

As mentioned, when a UE shares a LNA for combinations of RATs (e.g., LTE and NR), there is a possibility of LNA damage when at least one of the RATs is operating using TDD. This damage results when one of the RATs is scheduled to transmit during a period that another RAT is attempting to receive. This causes the LNA to be exposed to the transmit power of the transmit chain.

In some previously known devices, this issue was avoided using a hardware-based solution. In those devices turning on the power amplifier (PA) for the LTE transmit chain would automatically shunt or ground the LNA on the receive path.

In aspects of the present disclosure, for band combinations like B41+n41 (i.e., LTE on frequency band 41 and NR on frequency band 41) with a TDD non-standalone (NSA) NR architecture in a UE that shares an LNA for the two RATs on frequency band 41, TDD configurations on NR and LTE that are different from each other are not desirable. For example, an uplink (UL) slot in NR should not overlap with a downlink (DL) slot in LTE. If such an overlap occurs, then a UE could suffer the above-described LNA damage, if one RAT is receiving while the other RAT is transmitting at high power. For example, a quadrature LNA (qLNA) may typically survive up to 150 µs of transmit power at 18 dBm, but not more powerful or for longer durations. In addition, transmitting with one RAT while receiving with another RAT in the same band can cause desensitization of the receive path and high interference with reception. Thus, performance of the UE can be expected to suffer heavily.

In addition, the damage to the LNA can cause loss of the ability to control an LNA toggle or to set gains correctly in the receive chain. Also, the measured fast Fourier transform (FFT) energy estimation (FFTEE) and/or the cell reference signal (CRS) energy estimation (CRSEE) functions of the LTE RAT for the UE may be corrupted by transmissions on the NR RAT and vice-versa, leading to potential incorrect settings on the UE and/or rejection of desired signals by the UE.

In aspects of the present disclosure, there may also be severe PA damage in cases when one RAT is transmitting while another RAT is attempting to receive, if not handled properly.

Figure 5:
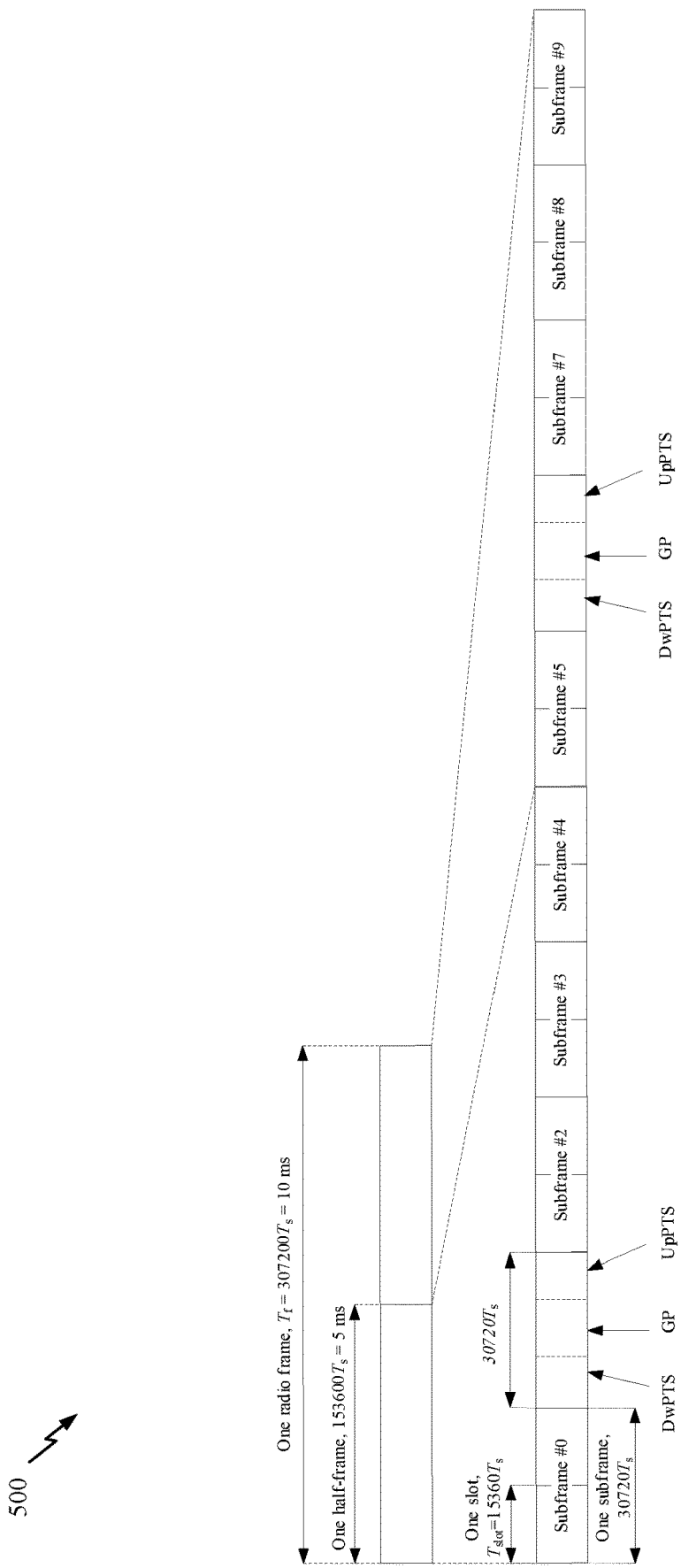
FIG. 5 illustrates an example frame format for a telecommunication system, in accordance with certain aspects of the present disclosure.

FIG. 5 shows an example frame format 500. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

A link direction (e.g., DL, UL, or flexible) may be indicated for each symbol, and the link direction for each subframe may be dynamically switched. The link directions may be based on the slot format. Each slot may include DL/UL data as well as DL/UL control information.

According to aspects of the present disclosure, a UE can expect that LTE and NR network configurations will provide compatible TDD configurations, i.e., an LTE DL slot will align with an NR DL or flexible slot and an LTE UL slot will align only with an NR UL or flexible slot. The UE can also expect the network to ensure that LTE and NR have time synchronization up to a maximum reference time differential (MRTD) of ±3 µs. If those expectations are not met, then many or all of the above-described issues may occur on the UE.

In aspects of the present disclosure, while the network is expected to configure compatible configurations for LTE and NR, these configurations are not necessarily the same configurations. In addition, some networks could be configured in error.

Thus, it is desirable to develop software-based solutions to protect LNAs in UEs which share the LNAs between a first RAT (e.g., LTE) and a second RAT (e.g., NR).

Example Time Division Duplex Configuration Override

Aspects of the present disclosure provide for overriding the time division duplex (TDD) configuration for user equipments (UEs) which share a low noise amplifier (LNA) between a first radio access technology (RAT) (e.g., long term evolution (LTE)) and a second RAT (e.g., 5G new radio (NR)). According to aspects of the present disclosure, when the UE overrides TDD configurations, the UE changes the link direction of the TDD configuration of the second RAT for a particular slot with the link direction of the TDD configuration of the first RAT for the corresponding slot. For example, UE replaces an NR uplink (UL) slot with a NR downlink (DL) slot to make this slot compatible with an LTE DL slot in the first RAT.

Figure 6:
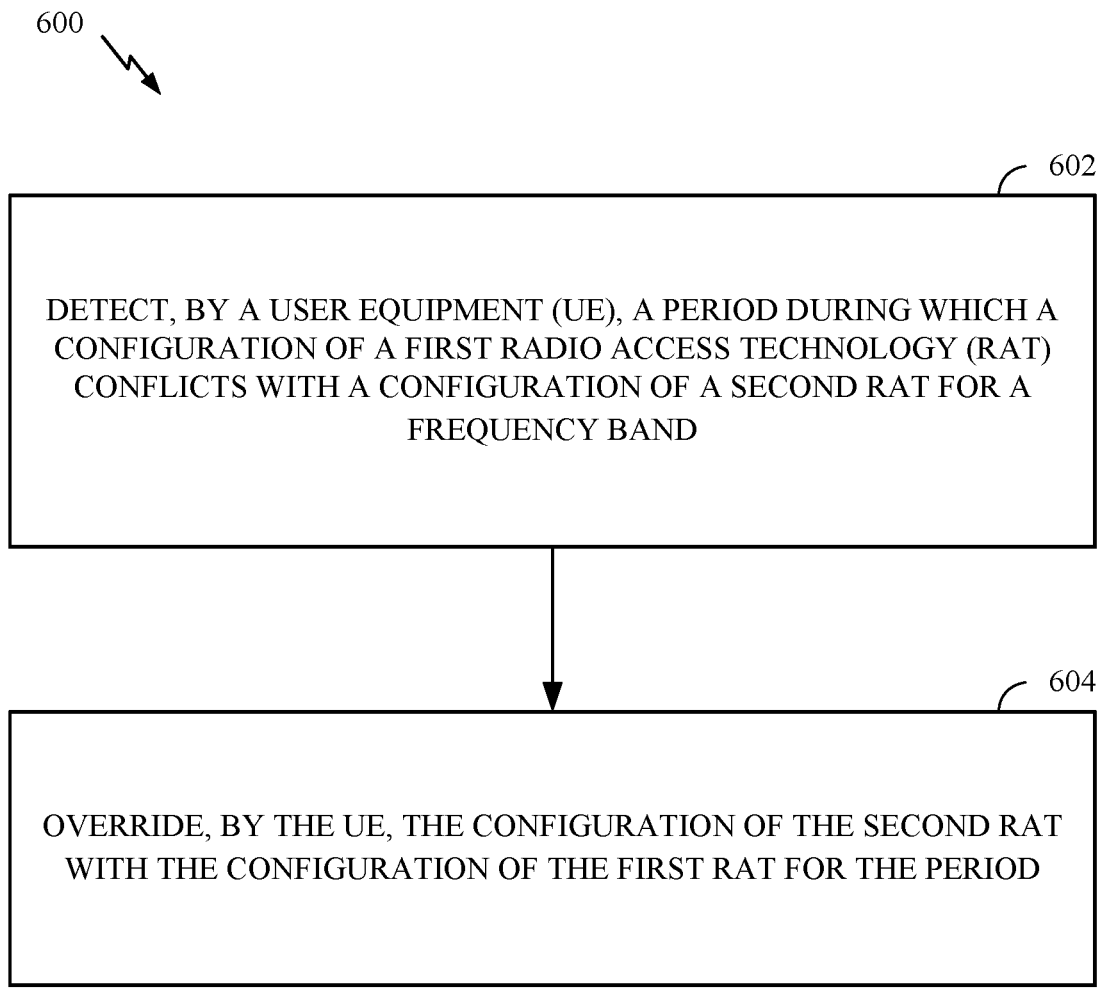
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by UE (e.g., such as a UE 120a in the wireless communication network 100). Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 602, by detecting a period during which a configuration of a first RAT conflicts with a configuration of a second RAT for a frequency band.

At 604, the UE overrides the configuration of the second RAT with the configuration of the first RAT for the period.

Aspects of the present disclosure provide for overriding a TDD configuration for UEs configured for dual connectivity. If the TDD configuration of a first RAT (e.g., LTE) matches the TDD configuration of a second RAT (e.g., NR) for a period (e.g., a slot), there is no conflict and the UE does not need to override any configurations. However, if the TDD configuration of the first RAT (e.g., an LTE DL slot) conflicts with the configuration of the second RAT for a period (e.g., an NR UL slot), then the UE may override the TDD configuration of the second RAT to make it compatible with the configuration in the first RAT. When the UE overrides the TDD configuration of the second RAT, the UE may change the link direction of the TDD configuration of the second RAT to make it compatible with the link direction of the TDD configuration of the first RAT.

For example, if the configuration for the first RAT is downlink for a period (e.g., an LTE DL slot) and the configuration for the second RAT is also downlink for the period (e.g., an NR DL slot), then there is no conflict and the UE does not need to override any configurations.

However, if the configuration of the first RAT is downlink for a period and the configuration for the second RAT is flexible for the period, then there is a conflict and the UE overrides the configuration of the second RAT for the period with downlink for the period (corresponding to the configuration of the first RAT for the period). For example, UE replaces an NR UL slot with an NR DL slot to make this slot compatible with a LTE DL slot in the first RAT. In some aspects, the UE may use grant-based decisions (e.g., LTE uSleep decisions) to dynamically handle the overriding of the configuration of the second RAT.

If the configuration of the first RAT is downlink for a period and the configuration for the second RAT is uplink for the period, then the UE overrides the configuration of the second RAT for the period with downlink for the period.

If the configuration of the first RAT is uplink for a period and the configuration for the second RAT is downlink for the period, then the UE overrides the configuration of the second RAT for the period with uplink for the period. When the configuration of the first RAT is uplink and the configuration for the second RAT is downlink, in addition to overriding the configuration of the second RAT with uplink, the UE may also gate any downlink transmissions that are not to be scheduled based on the configuration of the second RAT. For example, the UE may prevent uplink transmissions on the second RAT even after the UE overrides the configuration of the second RAT to uplink for the period because these uplink transmission were not scheduled based on the configuration prior to override. In some aspects, the UE overrides the configuration of the second RAT for the period with uplink for the period when uplink is scheduled for the first RAT and the first RAT is LTE.

If the configuration of the first RAT is uplink for a period and the configuration for the second RAT is flexible for the period, then the UE overrides the configuration of the second RAT for the period with uplink for the period. When the configuration for the first RAT is uplink and the configuration for the second RAT is flexible, in addition to overriding the configuration of the second RAT with the configuration of the first RAT, the UE may also gate any uplink transmissions that are not to be scheduled based on the configuration of the second RAT. In some aspects, the UE overrides the configuration of the second RAT for the period with uplink for the period when uplink is scheduled for the first RAT and the first RAT is LTE.

If the configuration for the first RAT is uplink for a period and the configuration for the second RAT is also uplink for the period, then there is no conflict and the UE does not need to override any configurations.

If the configuration for the first RAT is gap for a period, then there may be a conflict with the configuration of the second RAT regardless of whether the configuration of the second RAT is downlink, uplink, or flexible for the period. In some aspects, the UE may maintain one or more gap symbols in the period and override other symbols in the period as uplink symbols. In other aspects, the UE may transfer the current accumulated timing advances (TA) from the first RAT to the second RAT. In such aspects, the UE overrides the configuration of the second RAT to be flexible for symbols equal to the number of timing advances in the first RAT until an upcoming medium access control (MAC) control element (MAC-CE). In some aspects, the UE may aggregate timing advance (TA) information from different transmissions with component carriers of the first RAT. The UE may not necessarily always override a gap symbol of the first RAT with a downlink symbol.

According to some examples, the configuration used for override may be the same as the configuration of a component carrier of the first RAT sharing a receive path with the second RAT. Similarly, the configuration used for override may be the same as the configuration of the primary component carrier of the first RAT. In some cases, component carriers of the first RAT and component carrier of the second RAT share a radio frequency path of the UE. The first RAT and/or the second RAT may use uplink carrier aggregation (CA).

According to some examples, for some band combinations, like B41+n41 (i.e., LTE on frequency band 41 and NR on frequency band 41), the first RAT and the second RAT may have separate and simultaneous transmission. In such examples, the UE may override the TDD configuration of the second RAT for a period with the TDD configuration of the first RAT for the period.

For some band combination, like B71+n71 (i.e., LTE on frequency band 71 and NR on frequency band 71), uplink transmissions may be transmitted on a secondary band of the first RAT (e.g., LTE on frequency band 5). In such aspects, the UE may not need to override the configuration of the second RAT if the configuration of the second RAT is downlink or flexible for the period because uplink transmissions on the first RAT may not impact the second RAT. However, the UE may need to override if the configuration of the first RAT is downlink for the period and the configuration of the second RAT conflicts (e.g., uplink or flexible for the period). In some aspects, the primary component carrier (PCC) for the first RAT is on a separate LNA and/or receive path from the secondary component carrier (SCC) of the first RAT. The SCC of the first RAT may share paths with component carriers of the second RAT and may not transmit.

Some aspects of the present disclosure involve aligning a pattern of configuration of the first RAT (e.g., a common E-UTRAN new radio dual connectivity (ENDC) pattern) with the frame boundary of the second RAT. The UE may receive a pattern of configuration for the first RAT with identification of the frame boundary of the second RAT in the form of the uSTMR (universal System timer). To align the common ENDC pattern to the configuration of the second RAT, the UE determines a difference in frame boundaries between the first RAT and the second RAT. The UE then shifts the pattern of the configuration of the first RAT by the difference in the frame boundaries so that the sequence of subframes of the second RAT matches a sequence of subframes of the first RAT. The sequence of subframes may refer to the order in time of UL, DL, and/or gap symbols as given in a TDD configuration.

Some aspects of the present disclosure involve rejecting TDD configurations if the number of TDD configuration conflicts during a period meets or exceeds a threshold of conflicts. After detecting the period during which a configuration of a first RAT conflicts with a configuration of a second RAT, the UE may reject the configuration of a component carrier of the second RAT based on the number of conflicts meeting or exceeding a threshold of conflicts between the configuration of the first RAT and the configuration of the second RAT. For example, when the UE rejects the configuration of the component carrier of the second RAT, the UE does not use the rejected configuration and instead uses a different TDD configuration that is compatible with the configuration of the first RAT. In some aspects, overriding the TDD configuration of the second RAT may include rejecting the TDD configuration of the second RAT. Another form of rejection is to declare an RLF (radio link failure) for one of the component carriers.

Figure 7:
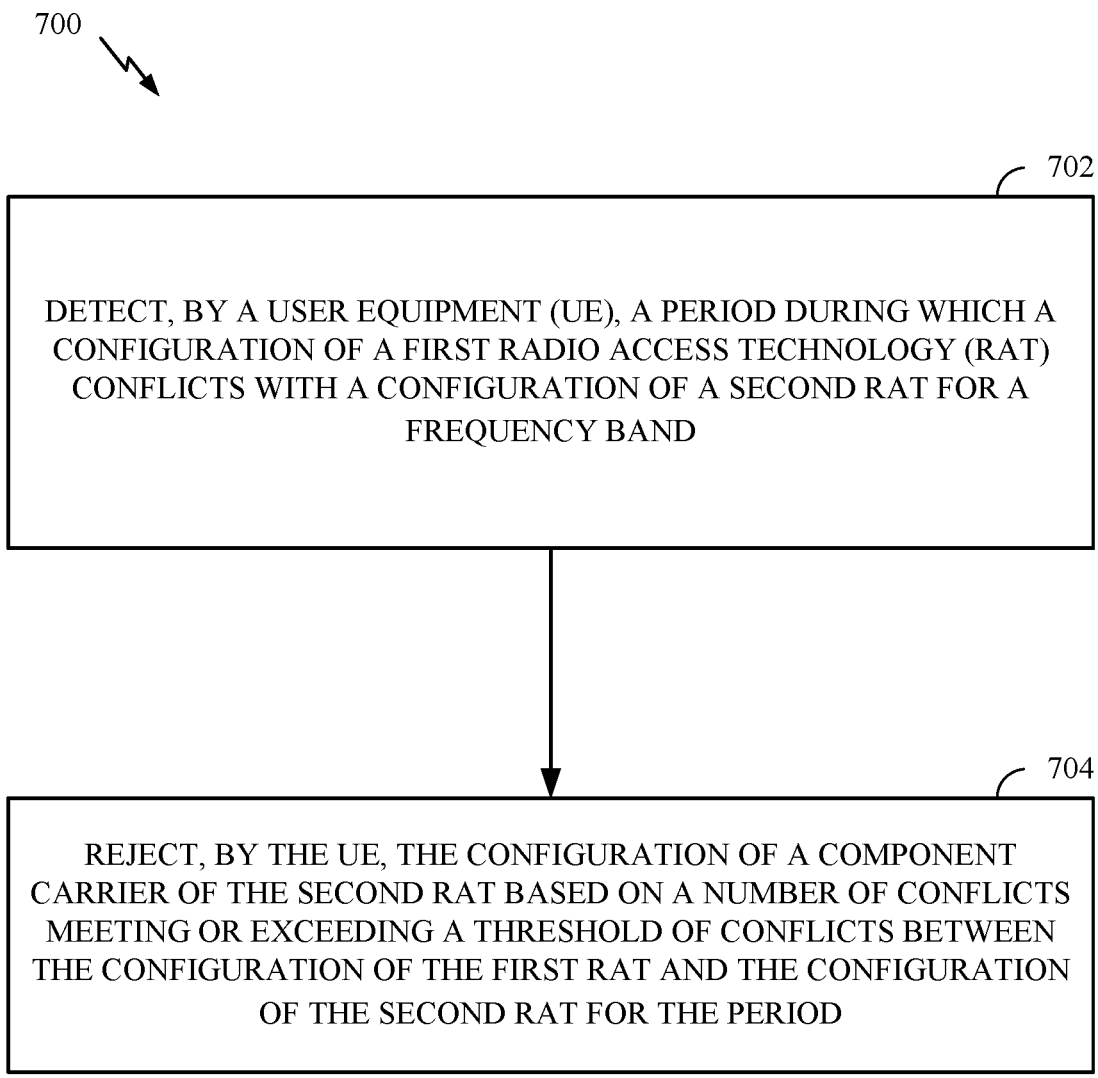
FIG. 7 is a flow diagram illustrating example operations for wireless communication by a UE, in accordance with certain aspects of the present disclosure.

FIG. 7 is a flow diagram illustrating example operations 700 for rejecting TDD configurations if the number of TDD configuration conflicts meets or exceeds a threshold of conflicts, in accordance with certain aspects of the present disclosure. The operations 700 may be performed, for example, by UE (e.g., such as a UE 120a in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 702, by detecting a period during which a configuration of a first RAT conflicts with a configuration of a second RAT for a frequency band.

At 704, the UE rejects the configuration of a component carrier of the second RAT based on a number of conflicts meeting or exceeding a threshold of conflicts between the configuration of the first RAT and the configuration of the second RAT for the period.

In some aspects, the threshold of conflicts may be a number or percentage of mismatches between the configuration of the first RAT and the configuration of the second RAT. The UE may determine a threshold of conflicts (i.e., a tolerated level of inconsistencies between the configurations). For example, for a given period, the TDD configuration of the second RAT is all downlink and the TDD configuration of the first RAT is all uplink. In this example, the TDD configuration of the second RAT is explicitly incompatible with the TDD configuration of the first RAT. In such aspects, the UE may reject the configuration of a component carrier of the second RAT if the conflicts between the configurations of the first RAT and the second RAT exceed this threshold of conflicts. In some aspects, the UE may reject the configuration instead of overriding with the configuration of the first RAT. In some aspects, the UE may declare secondary cell group (SCG) radio link failure (RLF) based on the number of conflicts between the configurations exceeding the threshold of conflicts. Once the UE rejects the configuration of the component carrier of the second RAT, the UE may use a previously used TDD configuration in place of the rejected configuration because the previously used TDD configuration of the second RAT may be compatible with TDD configuration of the first RAT.

In some aspects, the UE may have a single subscriber identity module (SIM) having a subscription to a network via the first RAT and via the second RAT. In such aspects, the UE may be actively connected to the network via the first RAT and the second RAT. In other aspects, the UE may have multiple SIMS—one SIM may have a subscription to the network via the first RAT, and another SIM may have a subscription to the network via the second RAT. In such aspects, the first RAT and the second RAT share a receive path of the UE in idle mode.

In some aspects, the UE may override the configurations for a special subframe based on the number of DL and/or UL symbols on all component carriers. For example, the configuration of the first RAT comprises three component carriers and the configuration of the second RAT comprises a primary SCell. In such aspects, the UE may check for the maximum number of DL symbols in the special subframe for all of the component carriers and use this information for overriding the configuration of the second RAT. Similarly, the UE may check for the maximum number of UL symbols in the special subframe for all of the component carriers and use this information for overriding the configuration of the second RAT. In some examples, the UE may include override functions that may or may not include gap symbols.

For a UE configured with multiple components carriers of the first RAT, the UE may not be configured to transmit via all of the component carriers. Accordingly, in such aspects, overriding of the configuration for the component carriers by the UE may be restricted to DL symbols.

Figure 8:
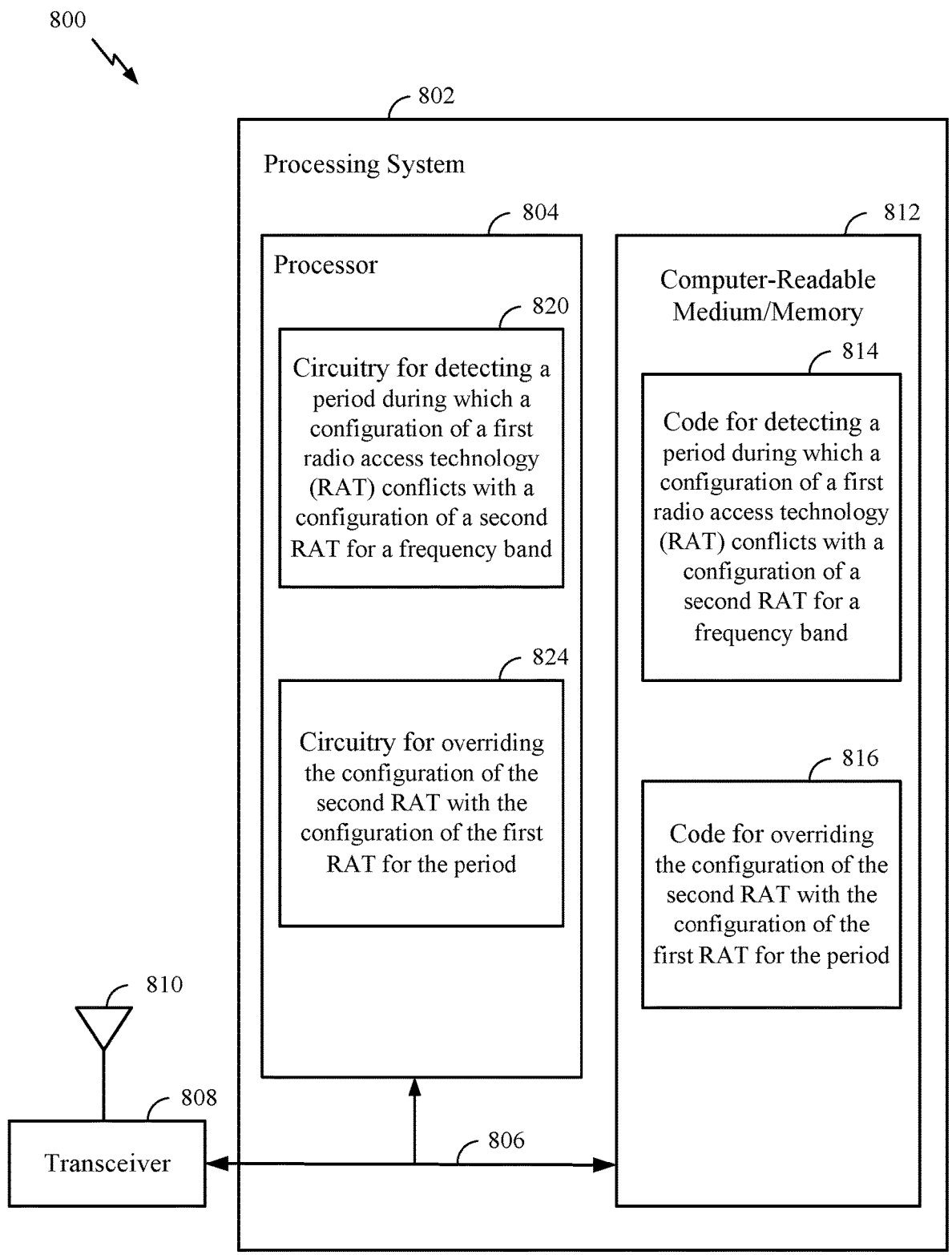
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for overriding TDD configurations. In certain aspects, computer-readable medium/memory 812 stores code 814 for detecting a period during which a configuration of a first RAT conflicts with a configuration of a second RAT for a frequency band; and code 816 for overriding the configuration of the second RAT with the configuration of the first RAT for the period. In certain aspects, the processor 804 has circuitry configured to implement the code stored in the computer-readable medium/memory 812. The processor 804 includes circuitry 820 for detecting a period during which a configuration of a first RAT conflicts with a configuration of a second RAT for a frequency band; and circuitry 824 for overriding the configuration of the second RAT with the configuration of the first RAT for the period.

For example, means for receiving (or means for obtaining) may include a receiver and/or antenna(s) 252 of the UE 120a illustrated in FIG. 2 and/or circuitry 820 of the communication device 800 in FIG. 8. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 802 of the communication device 800 in FIG. 8.

Figure 9:
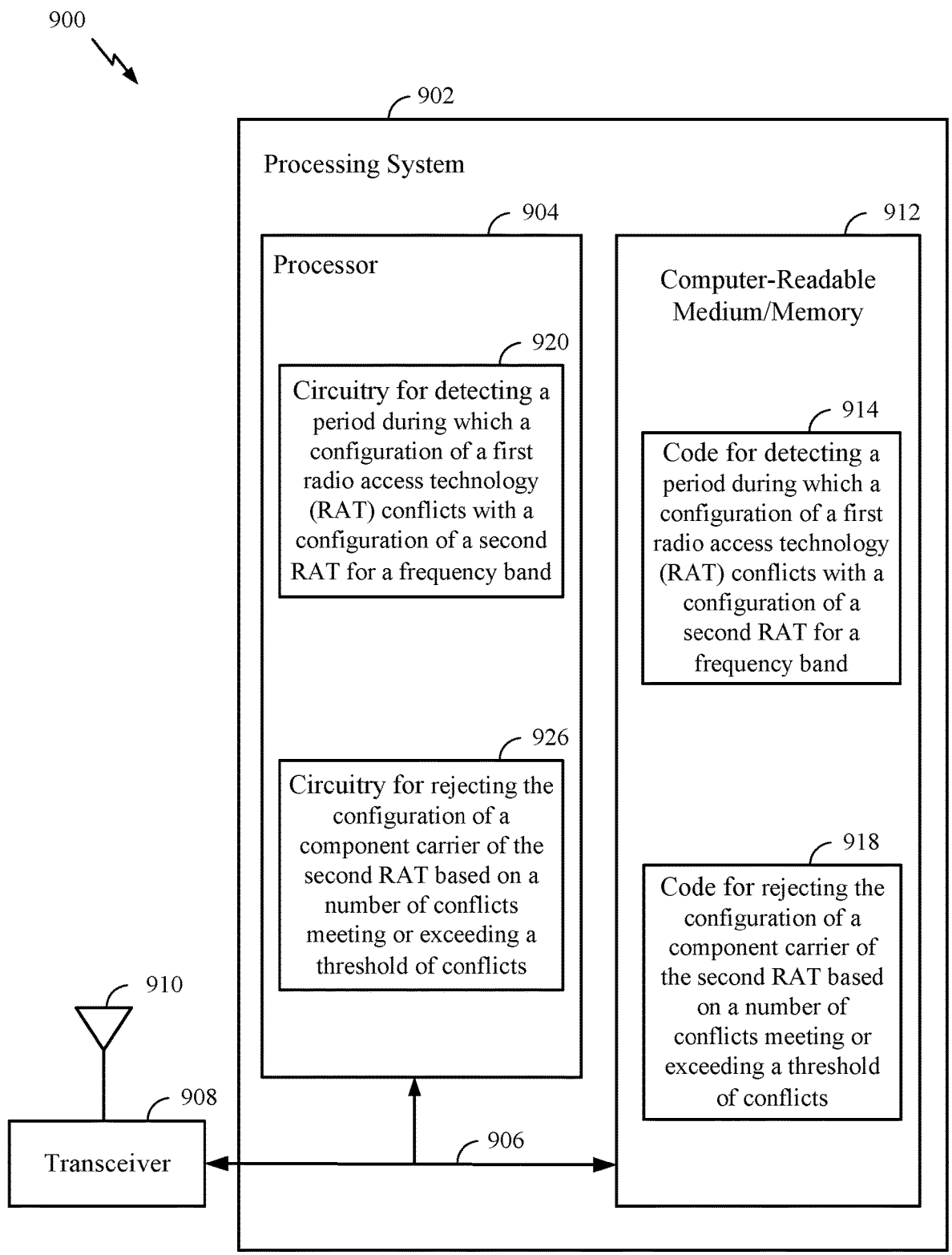
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for overriding TDD configurations. In certain aspects, computer-readable medium/memory 912 stores code 914 for detecting a period during which a configuration of a first RAT conflicts with a configuration of a second RAT for a frequency band; and code 918 for rejecting the configuration of a component carrier of the second RAT based on a number of conflicts meeting or exceeding a threshold of conflicts between the configuration of the first RAT and the configuration of the second RAT for the period. In certain aspects, the processor 904 has circuitry configured to implement the code stored in the computer-readable medium/memory 912. The processor 904 includes circuitry 920 for detecting a period during which a configuration of a first RAT conflicts with a configuration of a second RAT for a frequency band; and circuitry 926 for rejecting the configuration of a component carrier of the second RAT based on a number of conflicts meeting or exceeding a threshold of conflicts between the configuration of the first RAT and the configuration of the second RAT for the period.

For example, means for receiving (or means for obtaining) may include a receiver and/or antenna(s) 252 of the UE 120a illustrated in FIG. 2 and/or circuitry 920 of the communication device 900 in FIG. 9. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 902 of the communication device 900 in FIG. 9.

EXAMPLE ASPECTS

In a first aspect, a method for wireless communications performed by a user equipment (UE) includes: detecting a period during which a configuration of a first radio access technology (RAT) conflicts with a configuration of a second RAT for a frequency band; and overriding the configuration of the second RAT with the configuration of the first RAT for the period.

In a second aspect, in combination with the first aspect, the configuration of the first RAT comprises a time division duplex (TDD) configuration of the first RAT; the configuration of the second RAT comprises a TDD configuration of the second RAT; and overriding the configuration of the second RAT with the configuration of the first RAT comprises overriding the TDD configuration of the second RAT with the TDD configuration of the first RAT.

In a third aspect, in combination with any of the first and second aspects, a component carrier in the configuration of the first RAT shares a receiver path or a radio frequency path with a component carrier in the configuration of the second RAT.

In a fourth aspect, in combination with any of the first through third aspects, the first RAT comprises a long term evolution (LTE) RAT and the second RAT comprises a new radio (NR) RAT.

In a fifth aspect, in combination with any of the first through fourth aspects, the period begins when one of: a transmission via the first RAT collides with a slot or symbol during which the UE is receiving via the second RAT and the period ends when the collision ends; or a transmission via the second RAT collides with a slot or symbol during which the UE is receiving via the first RAT and the period ends when the collision ends.

In a sixth aspect, in combination with any of the first through fifth aspects, the configuration of the first RAT is downlink for the period and the configuration of the second RAT is one of uplink or flexible for the period.

In a seventh aspect, in combination with any of the first through sixth aspects, the configuration of the first RAT is downlink for the period and the configuration of the second RAT is flexible for the period; and overriding the configuration of the second RAT involves using grant-based decisions.

In an eighth aspect, in combination with any of the first through seventh aspects, the method further includes gating uplink symbols not scheduled per the configuration of the second RAT, wherein the configuration of the first RAT is uplink for the period and the configuration of the second RAT is flexible for the period.

In a ninth aspect, in combination with any of the first through eighth aspects, the configuration of the first RAT is uplink for the period and the configuration of the second RAT is downlink or flexible for the period.

In a tenth aspect, in combination with the ninth aspect, the method further includes gating downlink symbols not scheduled per the configuration of the second RAT In an eleventh aspect, in combination with any of the first through tenth aspects, the configuration of the first RAT is flexible for the period and the configuration of the second RAT is one of downlink, uplink, gap, or flexible for the period.

In a twelfth aspect, in combination with any of the first through twelfth aspects, the configuration of the first RAT is a gap period for the period; and wherein overriding the configuration of the second RAT comprises maintaining one or more gap symbols in the period and overriding other symbols in the period as uplink symbols.

In a thirteenth aspect, in combination with any of the first through twelfth aspects, the configuration of the first RAT is a gap symbol; and wherein overriding the configuration of the second RAT comprises overriding the configuration of the second RAT to be flexible for one or more symbols, a number of the one or more symbols equal to accumulated timing advances (TA) in the second RAT before an upcoming medium access control (MAC) control element (MAC-CE).

In a fourteenth aspect, in combination with any of the first through thirteenth aspects, the method further includes aggregating timing advance (TA) information from different transmissions with component carriers of the first RAT.

In a fifteenth aspect, in combination with any of the first through fourteenth aspects, the first RAT and second RAT have separate and simultaneous transmission.

In a sixteenth aspect, in combination with any of the first through fifteenth aspects, overriding the configuration of the second RAT with the configuration of the first RAT comprises: determining a difference in frame boundaries between the first RAT and the second RAT; and shifting a pattern of the configuration of the second RAT by the difference in the frame boundaries so that a sequence of subframes of the second RAT matches a sequence of subframes of the first RAT.

In a seventeenth aspect, in combination with any of the first through sixteenth aspects, a primary component carrier (PCC) for the first RAT is on a separate low noise amplifier (LNA) or receive path from a secondary component carrier (SCC) for the first RAT.

In an eighteenth aspect, in combination with any of the first through seventeenth aspects, at least one of the first RAT and the second RAT uses uplink carrier aggregation (CA).

In a nineteenth aspect, in combination with any of the first through eighteenth aspects, the UE comprises a subscriber identity module (SIM) having a subscription to a network via the first RAT and to the network via the second RAT, and the UE is actively connected to the network via the first RAT and the second RAT.

In a twentieth aspect, in combination with any of the first through nineteenth aspects, the UE comprises multiple subscriber identity modules (multi SIM) comprising a first SIM having a first subscription to a network via the first RAT and a second SIM having a second subscription to the network via the second RAT; and wherein the first RAT and the second RAT share a receive path of the UE in idle mode.

In a twenty-first aspect, a method for wireless communications performed by a user equipment (UE), includes: detecting a period during which a configuration of a first radio access technology (RAT) conflicts with a configuration of a second RAT for a frequency band; and rejecting the configuration of a component carrier of the second RAT based on a number of one or more conflicts meeting or exceeding a threshold of conflicts between the configuration of the first RAT and the configuration of the second RAT for the period.

In a twenty-second aspect, in combination with the twenty-first aspect, the method further includes declaring secondary cell group (SCG) radio link failure (RLF) based on exceeding the threshold of conflicts between the configuration of the first RAT and the configuration of the second RAT.

In a twenty-third aspect, in combination with any of the twenty-first through twenty-second aspects, the configuration of the first RAT comprises a time division duplex (TDD) configuration of the first RAT; and the configuration of the second RAT comprises a TDD configuration of the second RAT.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a user equipment (UE), comprising:
  detecting a period during which a first link direction of a first time division duplex (TDD) configuration of a first radio access technology (RAT) conflicts with a different second link direction of a second TDD configuration of a second RAT for a frequency band, wherein the first RAT is different from the second RAT; and overriding the configuration of the second RAT with the configuration of the first RAT for the period, wherein overriding the configuration of the second RAT with the configuration of the first RAT comprises:
determining a difference in frame boundaries between the first RAT and the second RAT; and
shifting a pattern of the second TDD configuration of the second RAT by the difference in the frame boundaries so that a sequence of subframes of the second RAT matches a sequence of subframes of the first RAT.

2. The method of claim 1, wherein:
overriding the configuration of the second RAT with the configuration of the first RAT comprises overriding the TDD configuration of the second RAT with the TDD configuration of the first RAT.

3. The method of claim 1, wherein a component carrier in the configuration of the first RAT shares a receiver path or a radio frequency path with a component carrier in the configuration of the second RAT.

4. The method of claim 1, wherein the first RAT comprises a long term evolution (LTE) RAT and the second RAT comprises a new radio (NR) RAT.

5. The method of claim 1, wherein the period begins when one of:
a transmission via the first RAT collides with a slot or symbol during which the UE is receiving via the second RAT and the period ends when the collision ends; or
a transmission via the second RAT collides with a slot or symbol during which the UE is receiving via the first RAT and the period ends when the collision ends.

6. The method of claim 1, wherein the configuration of the first RAT is downlink for the period and the configuration of the second RAT is one of uplink or flexible for the period.

7. The method of claim 1, wherein:
the configuration of the first RAT is downlink for the period and the configuration of the second RAT is flexible for the period; and
overriding the configuration of the second RAT involves using grant-based decisions.

8. The method of claim 1, further comprising: gating uplink symbols not scheduled per the configuration of the second RAT, wherein the configuration of the first RAT is uplink for the period and the configuration of the second RAT is flexible for the period.

9. The method of claim 1, wherein the configuration of the first RAT is uplink for the period and the configuration of the second RAT is downlink or flexible for the period.

10. The method of claim 9, further comprising: gating downlink symbols not scheduled per the configuration of the second RAT.

11. The method of claim 1, wherein the configuration of the first RAT is flexible for the period and the configuration of the second RAT is one of downlink, uplink, gap, or flexible for the period.

12. The method of claim 1, wherein the configuration of the first RAT is a gap period for the period; and
wherein overriding the configuration of the second RAT comprises maintaining one or more gap symbols in the period and overriding other symbols in the period as uplink symbols.

13. The method of claim 1, wherein the configuration of the first RAT is a gap symbol; and
wherein overriding the configuration of the second RAT comprises overriding the configuration of the second RAT to be flexible for one or more symbols, a number of the one or more symbols equal to accumulated timing advances (TA) in the second RAT before an upcoming medium access control (MAC) control element (MAC-CE).

14. The method of claim 1, further comprising aggregating timing advance (TA) information from different transmissions with component carriers of the first RAT.

15. The method of claim 1, wherein the first RAT and second RAT have separate and simultaneous transmission.

16. The method of claim 1, wherein a primary component carrier (PCC) for the first RAT is on a separate low noise amplifier (LNA) or receive path from a secondary component carrier (SCC) for the first RAT.

17. The method of claim 1, wherein at least one of the first RAT and the second RAT uses uplink carrier aggregation (CA).

18. The method of claim 1, wherein the UE comprises a subscriber identity module (SIM) having a subscription to a network via the first RAT and to the network via the second RAT, and the UE is actively connected to the network via the first RAT and the second RAT.

19. The method of claim 1, wherein the UE comprises multiple subscriber identity modules (multi SIM) comprising a first SIM having a first subscription to a network via the first RAT and a second SIM having a second subscription to the network via the second RAT; and wherein the first RAT and the second RAT share a receive path of the UE in idle mode.

20. An apparatus for wireless communications comprising:
means for detecting a period during which a first link direction of a first time division duplex (TDD) configuration of a first radio access technology (RAT) conflicts with a different second link direction of a second TDD configuration of a second RAT for a frequency band, wherein the first RAT is different from the second RAT; and
means for overriding the configuration of the second RAT with the configuration of the first RAT for the period, wherein the means for overriding the configuration of the second RAT with the configuration of the first RAT comprises:
means for determining a difference in frame boundaries between the first RAT and the second RAT; and
means for shifting a pattern of the second TDD configuration of the second RAT by the difference in the frame boundaries so that a sequence of subframes of the second RAT matches a sequence of subframes of the first RAT.

21. An apparatus for wireless communications at a user equipment (UE) comprising:
one or more or more processors, individually or collectively, configured to execute instructions stored on one or more memories and to cause the UE to:
detect a period during which a first time division duplex (TDD) configuration of a first radio access technology (RAT) conflicts with a different second link direction of a second TDD configuration of a second RAT for a frequency band, wherein the first RAT is different from the second RAT; and
override the configuration of the second RAT with the configuration of the first RAT for the period, wherein, in order to override the configuration of the second RAT with the configuration of the first RAT, the one or more processors are further configured to:

determine a difference in frame boundaries between the first RAT and the second RAT; and shift pattern of the second TDD configuration of the second RAT by the difference in the frame boundaries so that a sequence of subframes of the second RAT matches a sequence of subframes of the first RAT.

22. The apparatus of claim 21, wherein:

the code executable by the at least one processor to cause the apparatus to override the configuration of the second RAT with the configuration of the first RAT comprises code executable by the at least one processor to cause the apparatus to override the TDD configuration of the second RAT with the TDD configuration of the first RAT.

23. The apparatus of claim 21, wherein a component carrier in the configuration of the first RAT shares a receiver path or a radio frequency path with a component carrier in the configuration of the second RAT.

24. The apparatus of claim 21, wherein the first RAT comprises a long term evolution (LTE) RAT and the second RAT comprises a new radio (NR) RAT.

25. The apparatus of claim 21, wherein the period begins when at least one of:

a transmission via the first RAT collides with a slot or symbol during which the apparatus is receiving via the second RAT and the period ends when the collision ends; or a transmission via the second RAT collides with a slot or symbol during which the apparatus is receiving via the first RAT and the period ends when the collision ends.

26. The apparatus of claim 21, wherein at least one of the first RAT and the second RAT uses uplink carrier aggregation (CA).

* * * * *